(12) United States Patent
Akka et al.

(10) Patent No.: US 8,373,744 B2
(45) Date of Patent: Feb. 12, 2013

(54) STEREOPLEXING FOR VIDEO AND FILM APPLICATIONS

(75) Inventors: Robert Akka, Saulsalito, CA (US); Lenny Lipton, Los Angeles, CA (US); Matt Cowan, Bloomingdale (CA); Josh Greer, Beverly Hills, CA (US)

(73) Assignee: RealD Inc., Beverly Hills, CA (US)

( * ) Notice: Subject to any disclaimer, the term of this patent is extended or adjusted under 35 U.S.C. 154(b) by 533 days.

(21) Appl. No.: 11/811,047

(22) Filed: Jun. 7, 2007

(65) Prior Publication Data

US 2008/0303895 A1    Dec. 11, 2008

(51) Int. Cl.
*H04N 13/00* (2006.01)
*H04N 15/00* (2006.01)

(52) U.S. Cl. ........................................................ 348/43

(58) Field of Classification Search .................... 348/43, 348/47, 49
See application file for complete search history.

(56) References Cited

U.S. PATENT DOCUMENTS

| | | | | |
|---|---|---|---|---|
| 4,658,291 A | * | 4/1987 | Morishita | 348/43 |
| 4,672,443 A | * | 6/1987 | Dischert et al. | 348/445 |
| 4,790,028 A | * | 12/1988 | Ramage | 382/298 |
| 5,193,000 A | | 3/1993 | Lipton | |
| 5,416,510 A | | 5/1995 | Lipton et al. | |
| 5,537,144 A | | 7/1996 | Faris | |
| 5,615,287 A | | 3/1997 | Fu et al. | |
| 5,627,582 A | * | 5/1997 | Muramoto et al. | 348/43 |
| 5,767,898 A | * | 6/1998 | Urano et al. | 348/43 |
| 5,835,133 A | * | 11/1998 | Moreton et al. | 348/49 |
| 6,331,902 B1 | | 12/2001 | Lin | |
| 6,453,074 B1 | * | 9/2002 | Zheng | 382/260 |
| 7,158,158 B1 | | 1/2007 | Fleming | |
| 7,580,463 B2 | * | 8/2009 | Routhier et al. | 375/240.25 |
| 2004/0120396 A1 | | 6/2004 | Yun et al. | |
| 2005/0117637 A1 | | 6/2005 | Routhier et al. | |
| 2007/0183650 A1 | * | 8/2007 | Lipton et al. | 382/154 |

FOREIGN PATENT DOCUMENTS

| | | |
|---|---|---|
| EP | 1024672 A1 | 8/2000 |
| JP | 08-070475 | 3/1996 |
| KR | 10-2003-0001248 | 1/2003 |

(Continued)

OTHER PUBLICATIONS

Marjanovic, Matthew; "Interlace, Interleave and Field Dominance"; Copyrighted 2001; Digital Media Group; available at http://www.mir.com/DMG/interl.html.*

(Continued)

*Primary Examiner* — Mehrdad Dastouri
*Assistant Examiner* — Jeremaiah C Hallenbeck-Huber
(74) *Attorney, Agent, or Firm* — Baker & McKenzie LLP

(57) ABSTRACT

A method for multiplexing a stream of stereoscopic image source data including a series of left images and a series of right images combinable to form a series of stereoscopic images is provided. The primary application is for video applications, but film applications are also addressed. The method includes removing pixels from the stereoscopic image source data to form left images and right images and providing a series of single frames divided into portions, each single frame containing one right image in a first portion and one left image in a second portion. Multiplexing processes such as staggering, alternating, filtering, variable scaling, and sharpening from original, uncompressed right and left images may be employed alone or in combination, and selected or predetermined regions or segments from uncompressed images may have more pixels removed or combined than other regions.

28 Claims, 12 Drawing Sheets

FOREIGN PATENT DOCUMENTS

| | | |
|---|---|---|
| KR | 10-2007-0027318 | 3/2007 |
| KR | 1020070027318 A | 3/2007 |
| WO | 2007040472 A1 | 4/2007 |

OTHER PUBLICATIONS

Notice, International search report and written opinion of the international searching authority in corresponding PCT application No. PCT/US09/58845 mailed Jan. 13, 2010.

International search report and written opinion of international searching authority for co-pending PCT/US2008/006986 mailed Nov. 19, 2008

Soga et al., Development of a Digital 3D Broadcasting System Using Progressively Scanned Digital Broadcasting, SPIE vol. 3295; XP008022107 (1998).

European search report from co-pending European patent application No. EP08768074 mailed Jul. 8, 2010.

European search report from co-pending European patent application No. EP08768072 mailed Jul. 8, 2010.

European search report from co-pending European patent application No. EP08768072.4 mailed Jul. 8, 2010.

Examination report (Article 94(3) EPC) in co-pending EP application 08768074.0 mailed Aug. 9, 2011.

Examination report (Article 94(3) EPC) in co-pending EP application 08768072.4 mailed Aug. 9, 2011.

Anonymous: "Draft AVC amendment text to specify Constrained Baseline profile and supplemental enhancement information (G. Sullivan, A. Tourapis, and T. Yamakage) (Conveyed to WG 11 as Text of ISO/IEC 14496-10:200X/FPDAM 1 Constrained Baseline Profile and supplemental enhancement information)", 30. JVT Meeting; Jan. 29, 2009-Feb. 2, 2009; GENEVA, (Joint Video Team OFISO/IEC JTC1jSC29/WG11 and ITU-T SG.16 ), No. JVT-AD204, Jul. 7, 2009, XP030007462, ISSN: 0000-0079.

Anthony Vetro: "MVC Profile/Level Definitions for Stereo", 28. JVT Meeting; 85. MPEG Meeting; Jul. 20-25, 2008; Hannover, ;(Joint Video Team of ISO/IEC JTC1/SC29NVG11 and ITU-T SG.16 ), No. JVT-AB037, Jul. 20, 2008, XP030007423, ISSN: 0000-0090.

Supplemental European search report from EP Application No. 09817048 dated Sep. 11, 2012.

\* cited by examiner

STEREOPLEXING FOR VIDEO AND FILM APPLICATIONS

BACKGROUND OF THE INVENTION

1. Field of the Invention

The present invention relates generally to placing stereoscopic data within a single image channel, wherein an image channel that had been designed to carry planar movie signals carries a plano-stereoscopic or two-view stereoscopic image.

2. Description of the Related Art

Stereoscopic imaging is gaining in popularity, especially the plano-stereoscopic imaging technology that uses two planar images to produce a stereoscopic effect. However, the infrastructure established for electronic storage and distribution has been for a single planar image of the requisite quality. In order to store and transmit a commercially viable stereoscopic movie or image series, such data must operate within the existing infrastructure requirements and must also meet the specifications for image quality. A certain image quality level is expected of a planar image, and the stereoscopic image should barely be diminished with respect to that standard.

The quality of the planar image—in simple terms its sharpness, its color depth, the gradation of the image, in other words its fidelity—is dependent upon the bandwidth allocated to the image. To then attempt to place two images, a left and a right, within the existing bandwidth pipeline is to invite image compromise. The problem at hand can be stated as such: How can the stereoscopic designer maintain planar image quality even when a moving image stereoscopic pair is inserted into the existing storage and distribution pipeline?

Numerous attempts have been made to combine stereoscopic television (video) images and motion picture images to fit within the allocated transmission pipeline used for a single planar image. In some cases, especially for television images, designers have been concerned with the issue of backward or downward compatibility. Backward or downward compatibility would ensure that the stereoscopic signal can be constrained to be invisible to existing television receivers.

The present design seeks to cure the problem of transmitting stereoscopic images and movies over the existing infrastructure, which had been designed to transmit single planar images. It would be advantageous to offer a design that can provide multiplexed stereoscopic images without the need to replace existing components, and particularly a design that offers benefits over those previously available.

SUMMARY OF THE INVENTION

According to one aspect of the present design, there is provided a method for multiplexing a stream of stereoscopic image source data comprising a series of left images and a series of right images combinable to form a series of stereoscopic images. The method includes removing pixels from the stereoscopic image source data to form left images and right images and providing a series of single frames divided into portions, each single frame containing one right image in a first portion and one left image in a second portion.

Multiplexing processes such as staggering, alternating, filtering, variable scaling, and sharpening from original, uncompressed right and left images may be employed alone or in combination, and selected or predetermined regions or segments from uncompressed images may have more pixels removed or combined than other regions, or otherwise compressed to different quality levels than other regions.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which.

DETAILED DESCRIPTION OF THE INVENTION

Figure 1:
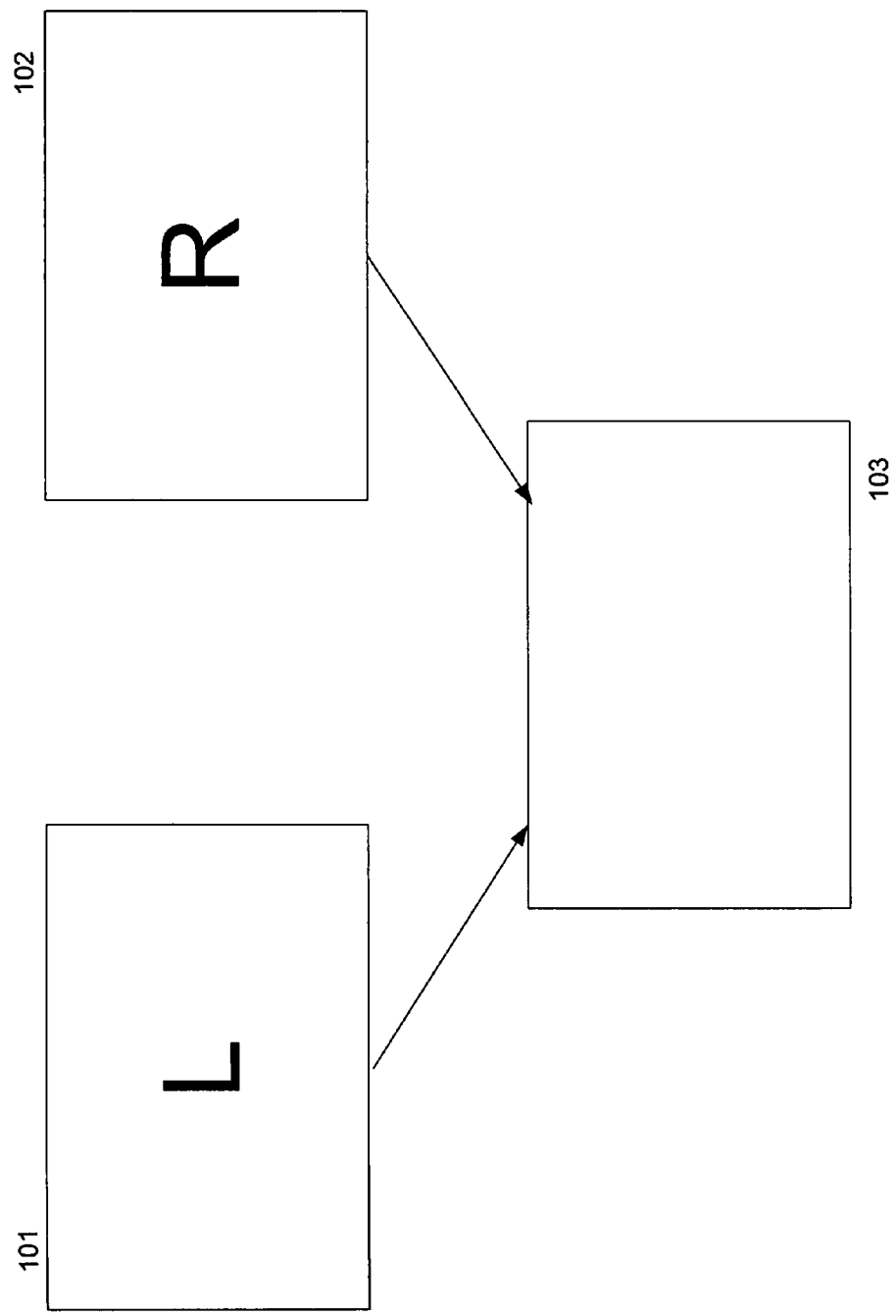
FIG. 1 shows that we are taking two stereo source image components, and multiplexing them to fit in a frame that is typically of the same size as either of the two image components.

The present design provides a means for transmitting stereoscopic images over existing infrastructure originally designed to transmit planar images. The present design is described in a series of related techniques. The concentration is on the multiplexing of the stereoscopic image, or what is termed the "stereoplexing" of the image. Two major requirements exist for stereoscopic imaging, one for distribution to theaters (film) and the other for home entertainment (video).

In general, video applications involve removing pixels from source image data and optimization in a video system that allows for playback using a variety of display monitors and selection technologies. Film applications are used for field sequential or temporal multiplexing, where the resultant stereoscopic images are shown on big theater screens. In general, compression is less for film applications than video applications, with an emphasis on variable compression across the frame width with a very sharp center area and sharpening at the edges to get the most out of the data transmitted.

Digital cinema at this point in time is making remarkable inroads, and a significant percentage of digital cinemas in the world today have stereoscopic capability. The ability to deal with left and right channels has been addressed within the existing professional motion picture standards with regard to signal or data transmission from a server to a projector.

In many instances the transmission of a live and not prerecorded event is required. In this case the bandwidth benefits afforded by a closed-circuit server hooked up directly to a projector are no longer available, because landlines and satellite transmission are designed to contain but one planar signal. The present design seeks to stereoplex the left and right signals to fit within the existing planar bandwidth commonly employed for both landlines and satellite transmission.

Because theatrical cinema imaging standards are extremely high, the problem becomes a difficult one to solve. It is not sufficient to force two images within the existing bandwidth and have the images survive at a reduced quality standard. The image must maintain the high performance standards that are associated with the theatrical cinema. Fortunately theatrical cinema images, although compressed, are compressed far less than television images. A typical compression for theatrical cinema images is 15:1, thus somewhat reducing the burden on the stereoplexing technology.

For stereoplexing for the cinema as well as for the home, no matter how the stereo pair of moving images is packaged, the stereo pair must survive the additional compression technology that is part of the motion picture infrastructure. In the case of the motion picture infrastructure, the compression standard that is most widely adopted is JPEG (Joint Photographic Experts Group) 2000. This protocol allows for high quality image transmission but with relatively modest compression. In the television realm for digital distribution of content on discs, for example, such as Blu-Ray or HD-DVD, compression ratios more in the range of 50:1 or 70:1 are prevalent, and these use the protocols such as MPEG (Motion Picture Experts Group) protocol.

Thus the multiplexing technology that combines the left and right stereo images into a single planar frame must in addition enable the images to survive the infrastructure compression protocols such as JPEG or MPEG. It must do all of this and produce an image commensurate in quality with the planar image for either motion pictures or television.

Such a task is similar to the introduction of NTSC (National Television System Committee) color television in the early '50s. A colorplexed signal was added in such a way as to not degrade the existing monochrome reception. Therefore, black-and-white televisions were able to pick up color broadcasts without any significant image impairment; whereas the new color television sets could play monochrome and also make use of the color signal for adding color information to the picture.

Downward compatibility is highly prized, but adds certain levels of complexity to the stereoplexing problem. Downward compatibility may not be required in today's environment. When NTSC color was introduced, a limited number of channels existed and there was no means for the user to play recorded content such as VHS tapes or DVD discs. Today the situation is different. Hundreds of channels are available on cable television, off-the-air television is available, and the ability exists to play back prerecorded discs. With this variety of options available, one needs to question the downward compatibility requirement for stereoscopic television—users can typically find something to watch without the need to have a fully downward compatible version of the highest quality technology. For motion pictures downward compatibility is simply not required because of the closed circuit nature and non-distribution of movie theater content to the outside world.

While not currently widely available, television can support some channels devoted to stereoscopic programming, and in the case of discs, for example, a precedent has been established wherein the letterbox format has been placed on one side of the disc and the Edison aspect ratio (1.3:1) on the other side of the disc, or occasionally included as separate data on the same side of the disc. Therefore, it seems appropriate that in today's environment a disc might have a planar version of a movie on one side and the stereoscopic version on the other, or stored in separate areas of the same side of the disc, or perhaps included on a different disk in the same retail package.

It is also possible for any stereoscopic storage scheme to be backward or downward compatible with monoscopic displays, in that there is the option to only display one of the two stereo views (i.e. just the left-eye view) on a monoscopic display.

The present design is primarily devoted to stereoplexing or encoding the signal without regard to the inverse function, namely demultiplexing or "demuxing" the signal. Several different but related techniques are described that can be used singly or in combination, and these are delineated in greater detail below.

Several general container approaches may be employed to produce a precursor format. A precursor format is a format that, while encoding the stereoscopic information, is adaptable with regard to the use of that information so that different displays and selection devices may be employed. For example, stereoscopic image selection could take place by means of anaglyph (red and green glasses), by the time-sequential method, by the polarization method, or by methods that have been enunciated in the past involving interlace, or micropolarizer technology, or the diagonal interlace that is a feature of certain DLP projectors.

Accordingly, the precursor format must have eclectic potential in the sense that, while containing the left and right perspective information, such information must be contained in a format that can then be used to greatest advantage dependent upon the projection or display format—or the monitor format and the stereoscopic image selection technology associated with that format, be it shuttering eyewear or passive eyewear or whatever may be desired. In order to have a commercially viable solution, the best approach is to use a precursor protocol described herein and, as mentioned, the concentration in this discussion is on the stereoplexing technology rather than the demultiplexing technology. Stereoplexing technology is software-dependent, and computers can be configured with software programs in, for example, post-production suites to accomplish stereoplexing.

On the other hand, motion picture projection or television sets require simplicity and low cost of goods. Here the solution, rather than being a software solution that can be extremely complex, is a hardware or firmware solution that is relatively simple and inexpensive.

Of the general methods that are described herein, one is the side-by-side multiplexing approach, in which the format is divided by a vertical line and the left and right images are placed into either the left or right half of the containers respectively. Obviously, for whatever reasons, the left image information could be on the right-hand of the frame and vice versa; and other dispositions of the information, such as above-and-below, are obvious extensions or alternatives of these teachings.

Another approach uses what is called the "quad-tile" approach, in which there are four tiles arranged with the left and right information distributed in two tiles each. In other words, the left information occupies two tiles, and the right information occupies two tiles. It will be explained below why this approach has certain advantages.

By following these and other precursor format approaches and taking care of certain other appropriate concerns, the image can survive being compressed according to compression schemes such as JPEG or MPEG. In addition, using the test results, psychophysical tests have been performed comparing uncompressed and compressed data. The images compressed according to these teachings survive compression and decompression and appear to have very nearly the same quality as the original uncompressed images. By "very nearly" it is meant that the only way to detect that the image has been compressed and uncompressed is for an observer to be positioned very close to the screen—much closer than any normal theater patron would be in a typical theater seating configuration, and additionally, to be concentrating specifically on particular details and looking for minor differences.

In addition to these precursor format containers, a description will be given for selecting pixels—in other words, pixel-plucking or sampling techniques that can then arrange the pixels to within the precursor container formats described. For a high quality stereoscopic experience, significant attention should be paid to this part of the process so that the resulting image will have minimal losses.

Yet another technique employed is where the stereoscopic or stereoplexing compression is varied across the width of the frame. In the simplest case, the least compression occurs in the middle of the frame because that is typically where the eyes' attention will be drawn in actual operation.

From FIG. 1, two stereo pair elements are shown, a left-eye view image 101 and a right-eye view image 102, that need to be stored in a frame 103, generally of equal size to either of the two stereo pair element images. Typically, each of the two stereo pair elements has a quality appropriate for non-stereoscopic viewing using the same general kinds of video storage, image processing, and display systems. For example, for a storage and display system that normally handles 1920×1080 pixel images at a particular standard of quality, one would expect that stereo pair elements handled by the same kind of system will each be of a similar quality, and therefore should normally be of the same pixel resolution. In other words, with a system that normally handles 1920×1080 content, it will be common for left-eye and right-eye elements to each be 1920×1080 as well.

Several techniques may be used in different combinations for multiplexing stereoscopic information into a single frame, or more specifically, to graphically compress either of the two stereo pair elements to fit the half-frame field that is allocated to it by the precursor format.

Figure 2:
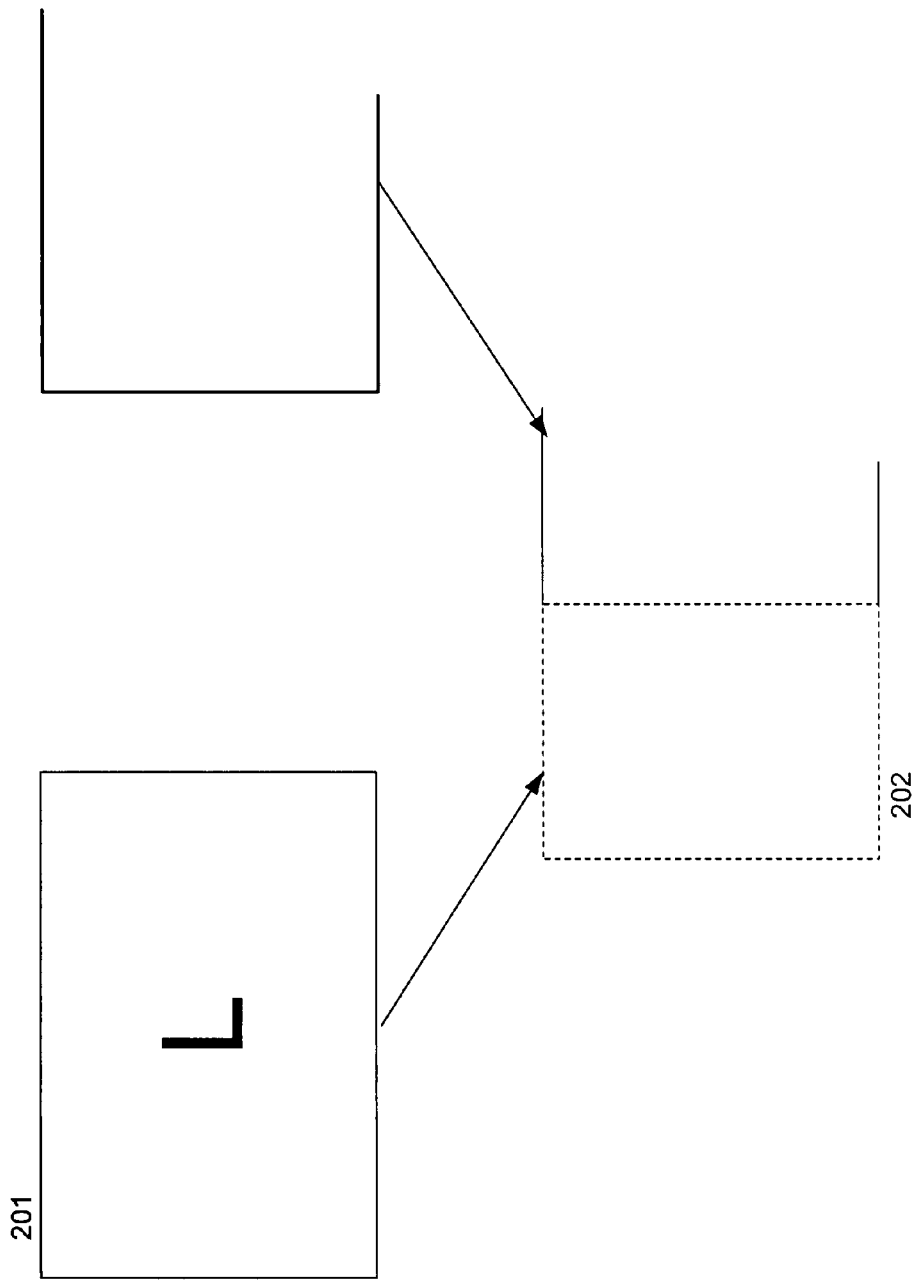
FIG. 2 shows each stereo source image component fitting in a sub-region of the destination frame, as specified by the precursor format.

FIG. 2 illustrates the concept of "precursor format," the general layout of left-eye and right-eye image data fields within the overall available image frame. The simplest precursor format separates the image frame into left and right halves, reserving each of those halves for storing image information from either of the two respective eye views. From FIG. 2, if the image frame size is 1920 pixels horizontally and 1080 pixels vertically, one might allocate the left half 202 of the frame (960×1080 pixels) to the left-eye view 201, and the right half to the right-eye view.

Thus, multiplexing two full-sized stereo pair elements to this particular precursor format becomes a problem of mapping one full-sized image to a half-sized image field, and doing so twice per stereo pair.

Figure 3:
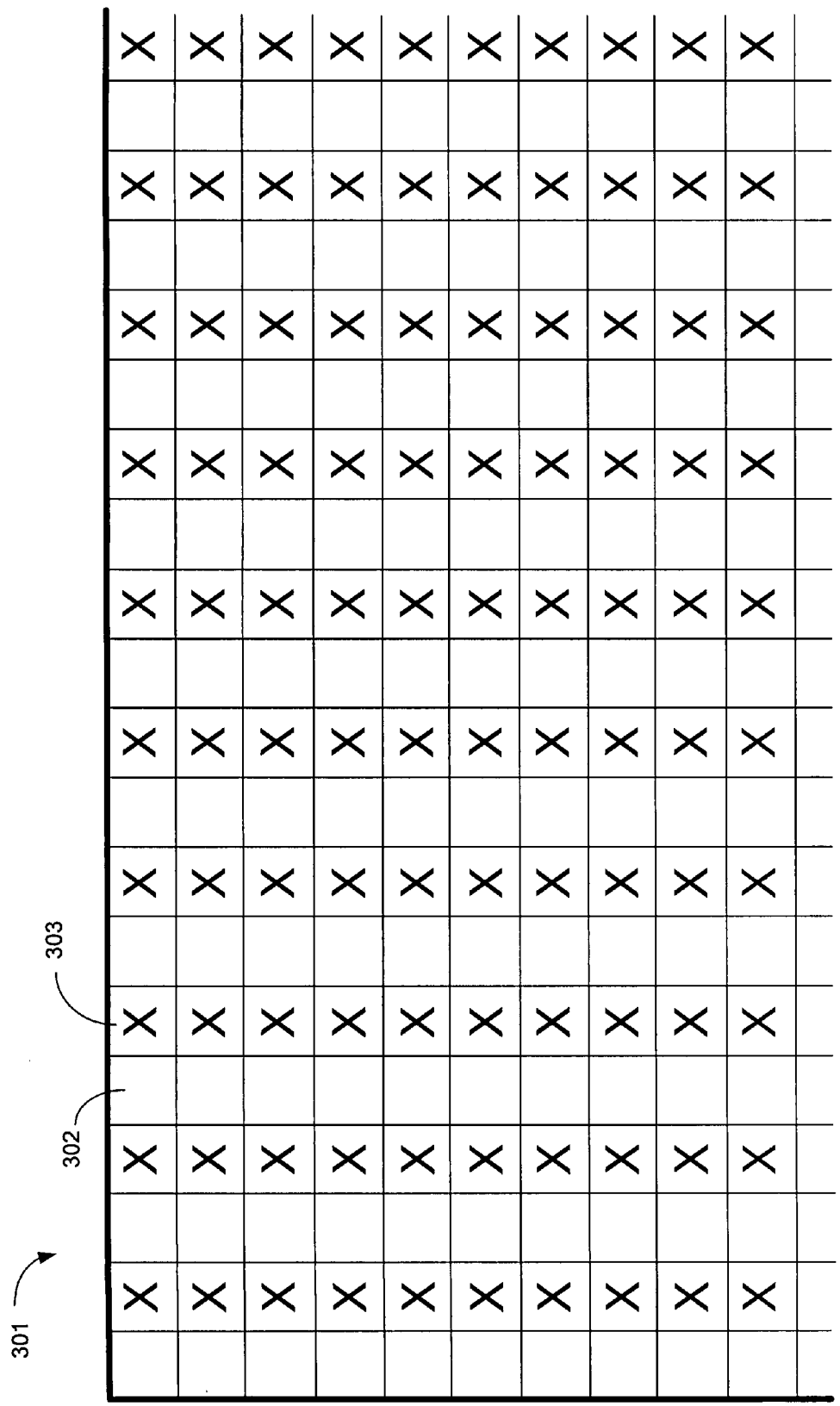
FIG. 3 demonstrates simple pixel selection, where alternating pixels are accepted or discarded.

Perhaps the simplest way to map a full-sized image to a half-sized field is to remove every other pixel from each row. For example, as shown in FIG. 3, transferring, from the original left-eye view 301, only pixels with even-numbered columns (such as the fifth pixel 302 in the first row, where the first column is number 0, an even numbered column) to the half-sized frame, while discarding other pixels (such as pixel 303), would be one way to do this. This general technique, picking some pixels and discarding others, is called "pixel selection," and may be successfully employed when multiplexing for the Texas Instruments so-called "checkerboard" video display. This style of multiplexing uses a side-by-side precursor format with pixel selection and an alternating-row staggering.

Figure 4:
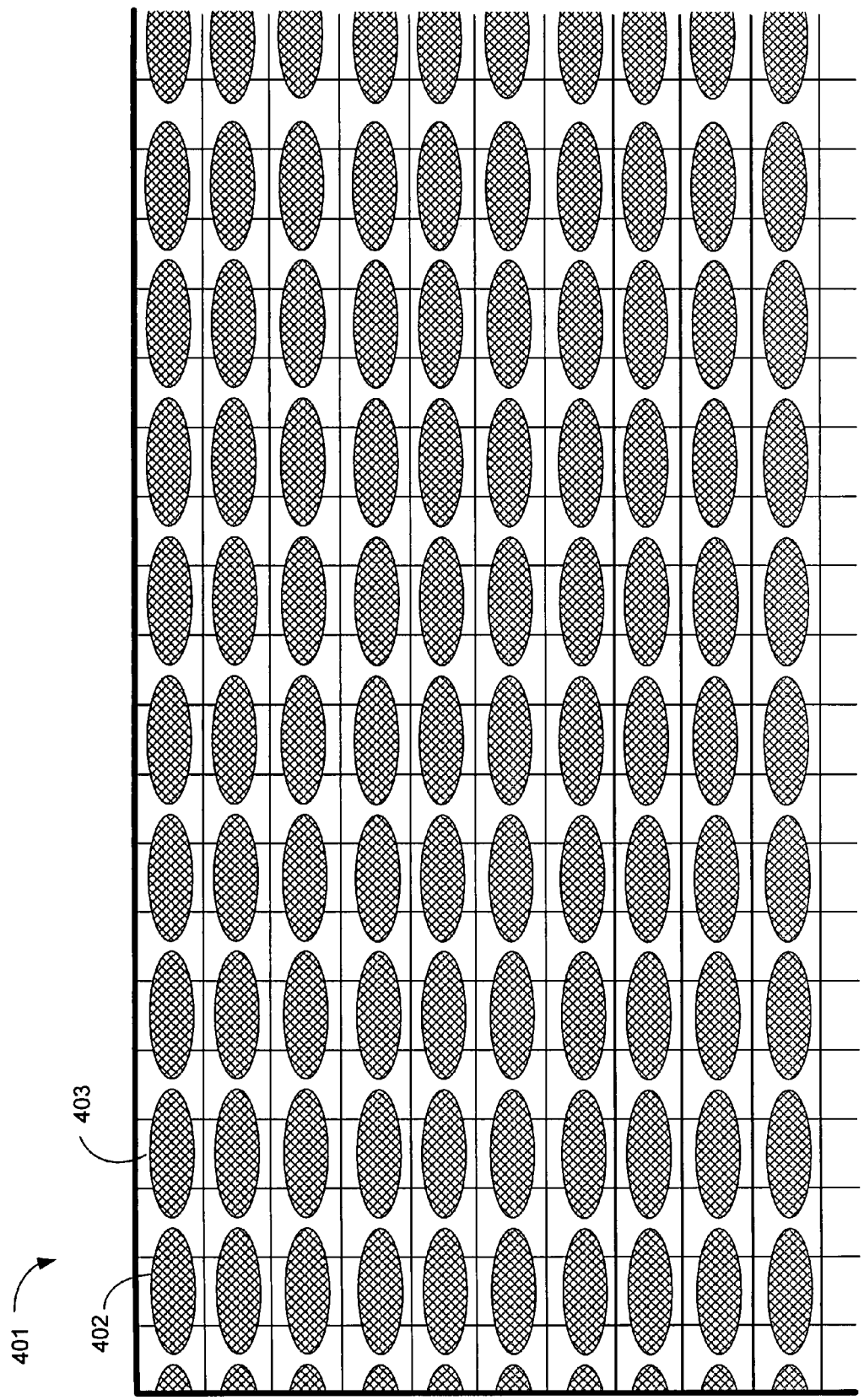
FIG. 4 illustrates filtered scaling.

The alternative to pixel selection comprises a variety of techniques generally referred to as "filtered scaling". When using filtered scaling, the pixel information mapped to the precursor field contains information derived from more than one source pixel. One example of a filtered scaling algorithm is to average two neighboring source pixels to calculate the value of any given pixel to be stored. Another algorithm might do a weighted average, where the stored pixel value primarily represents a single source pixel, whose value is also mathematically mixed with the values of neighboring pixels (along horizontal and/or vertical dimensions). The particular filtered scaling algorithm represented by FIG. 4 shows a source field 401 where resultant pixels (represented by ovals such as resultant pixels 402 and 403) draw primarily from odd-numbered columns in the source image, while also getting some pixel information from neighboring even-numbered columns. Note that a pixel with an even-numbered column (such as source pixel #2, the third pixel of the top row) contributes information to two different resultant pixels 402 and 403. There are a number of well known filtered scaling algorithms, such as linear filtering, bicubic filtering, and others, and any of these or variations thereof can be applied, including but not limited to variably applied bicubic scaling, variable sharpening, non-variably applied bicubic scaling, and non-variable sharpening.

Filtered scaling is a multiplexing technique that may most beneficially be employed for theater display. This multiplex technique uses side-by-side precursor format with variably applied bicubic scaling and variable sharpening applied after the demultiplex. Methods similar to this may also be applicable to flat-panel displays other than the TI "checkerboard" style of display.

Generally speaking, the pixel selection technique can be useful for preserving sharpness and minimizing processing overhead, while filtered scaling tends to yield smoother imagery with fewer artifacts.

Figure 5:
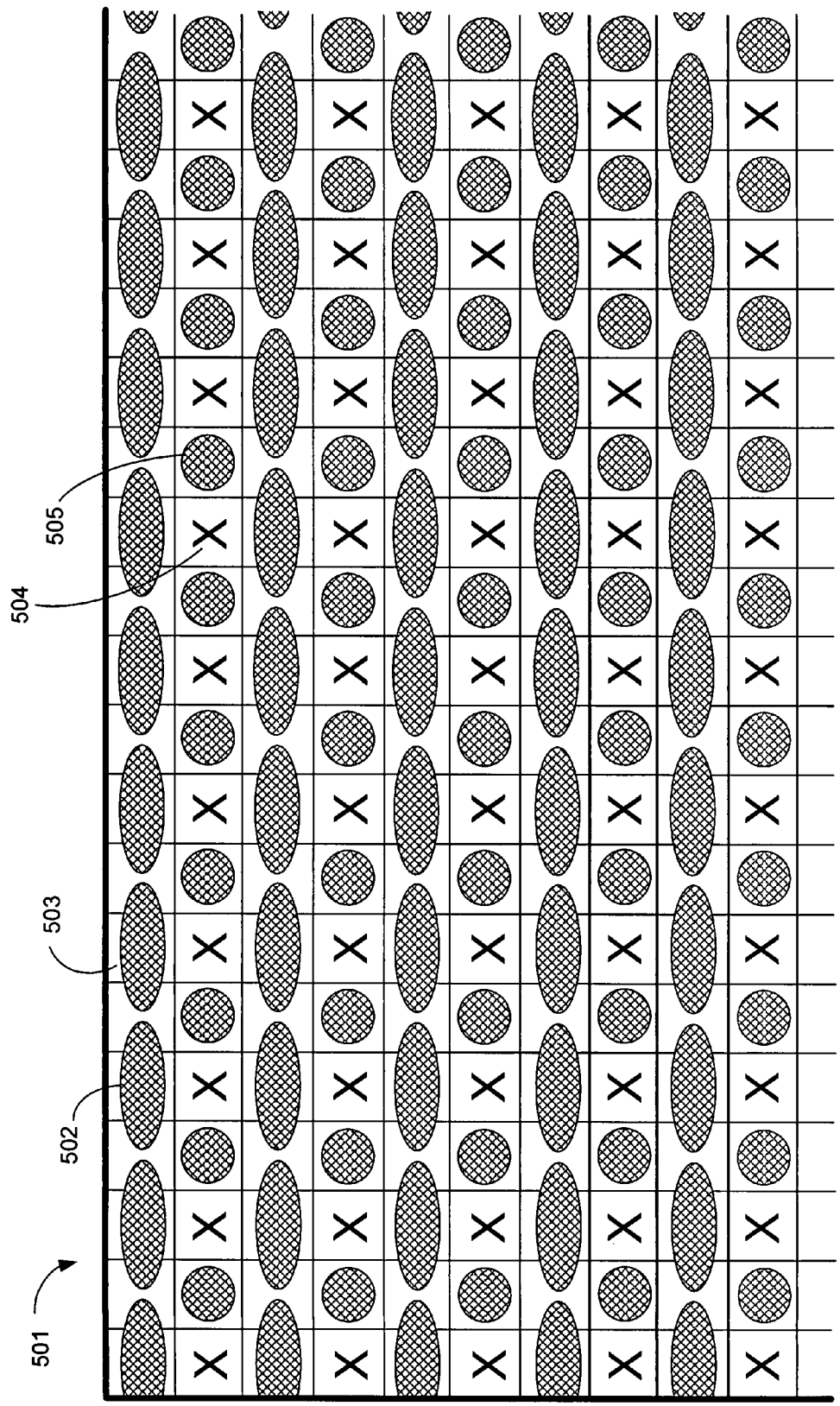
FIG. 5 shows alternating techniques being applied on alternating pixel rows, with filtered scaling appearing on the top row and every other row below it, with simple pixel selection being used on other rows.

Yet another option is called the "alternating technique," meaning to alternate the selection/scaling technique on alternating pixel rows. One example of the alternating technique is shown in FIG. 5, where simple pixel selection is employed on odd-numbered pixel rows (such as where, in left-eye field 501, pixel 504 is discarded while pixel 505 is transferred as is), while using a particular operation or filtered scaling method on even-numbered pixel rows (as where resultant pixels 502 and 503 get their information from several source pixels). This alternating technique has the potential to deliver the best of both selection and scaling; overall sharpness can be better than when using 100% filtered scaling, while the filtered scaling on alternating rows effectively reduces selection artifacts. The alternating technique can also consist of using two different types of filtered scaling on alternating pixel rows.

Figure 6:
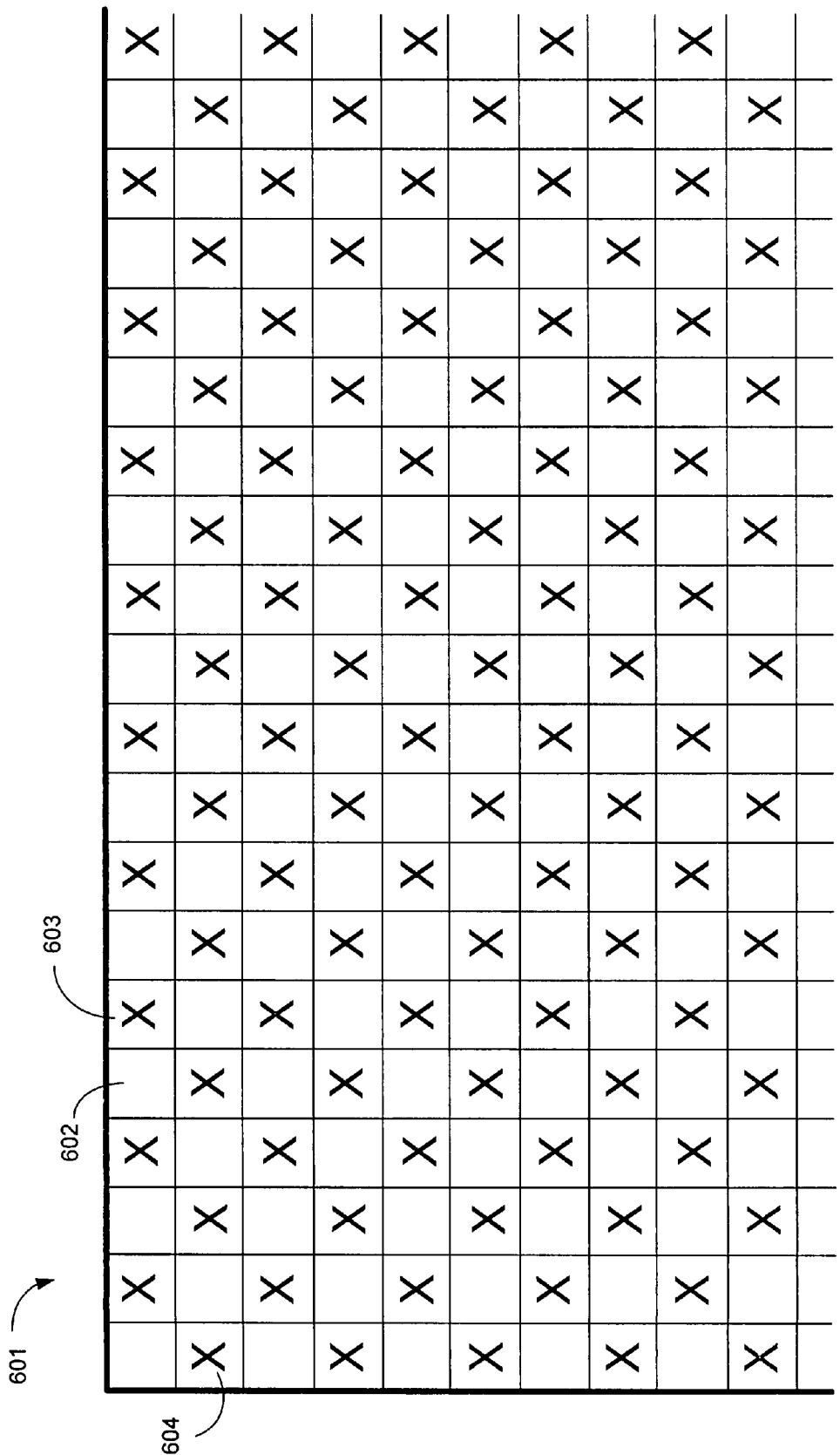
FIG. 6 demonstrates pixel selection with the staggering technique applied.

Another technique, called "staggering", can be used in combination with either pixel selection or the various filtered scaling methods (including alternating-technique methods), and can be beneficially used with the so-called "checkerboard" display manufactured and sold by Texas Instruments. With this technique, alternating rows obtain source data based on a staggered base in the source field. One example of staggering is shown in FIG. 6. A staggered pixel selection technique might choose, from a particular source image 601, even-column pixels, such as 602, from even-numbered rows (discarding odd-numbered pixels such as pixel 603), and selecting odd-column pixels from odd-numbered rows (discarding even-numbered pixels such as pixel 604). This example, combining pixel selection with staggering, actually results in a diagonal selection pattern, similar to picking only the black squares from a checkerboard. By staggering the selection in this manner, the selection becomes more effectively dimension-neutral, compared to a non-staggered column selection method, since a checkerboard texture is generally unchanged when rotated by 90 degrees.

Figure 7:
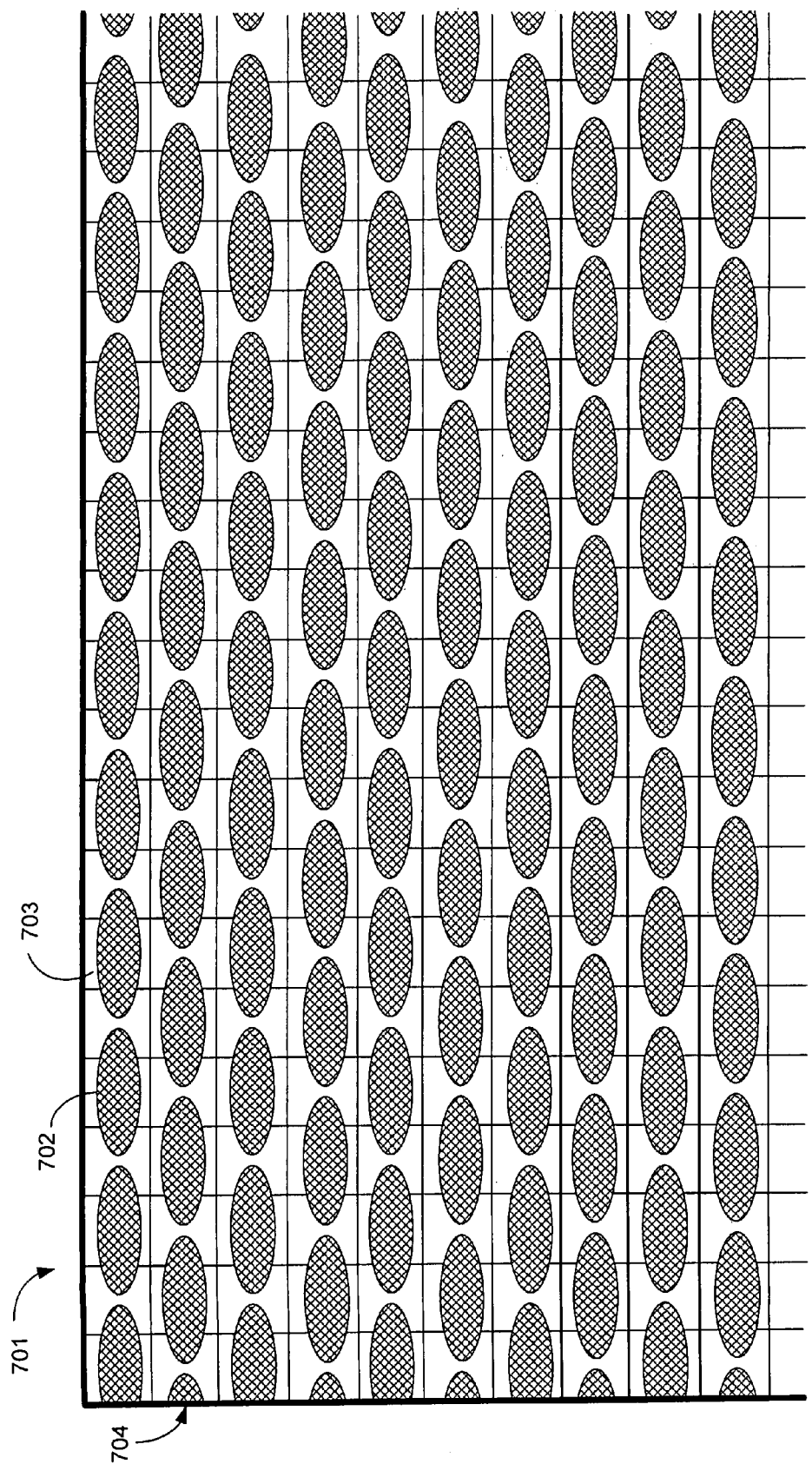
FIG. 7 shows staggering applied to a filtered scaling technique.

Staggering can be applied to any of the various filtered scaling options as well, with similar advantages compared to non-staggered filtered scaling. Staggering is also applicable in the TI "checkerboard" type of display. In the example of FIG. 7, left-eye view 701 is processed using a filtered scaling algorithm, such that resultant pixels 702 and 703 each get their information from more than one source pixel. However, while resultant pixels in the top row each draw primarily from even-numbered pixel columns (such as how resultant pixel 702 is centered, and has most of its area, over source pixel #4, and resultant pixel 703 is centered over source pixel #6), in the next row 704, resultant pixels draw primarily from odd-numbered pixel columns. Note that the first complete resultant pixel in this second row draws mainly from the second source pixel in the row, pixel #1, which is an odd-numbered pixel.

In addition to the advantage of making the selection or scaling dimension-neutral, the staggering technique has some additional advantages. Visual artifacts associated with vertical and near-vertical features are more effectively reduced. Also, some stereoscopic display systems such as the previously mentioned TI display system use a "checkerboard" or "diamond-interlace" pixel layout when in stereoscopic display mode; a staggered selection (or staggered filtered scaling) is typically more appropriate for mapping image data to such a display.

Staggering can, and generally should, be undone during demultiplexing so that the final images may be viewed without a stagger effect between alternating rows.

The stagger offset in alternating pixel rows can in certain circumstances interfere with clean image compression (or conversely, image compression algorithms might undermine the staggering). This may not be a significant problem. If staggering is being compromised, such effects can be addressed in ways discussed below.

The next technique, "variable scaling", is applicable to filtered scaling variations, but not the pixel selection technique (staggering and/or the alternating technique may be used, optionally) and may be beneficially employed in a theater environment. Variable scaling involves performing filtered scaling by varying amounts. For example, it is usually the case that the middle area the frame has scene elements that are of more critical interest than those along the edges of the frame. Thus, it can be advantageous to downscale mid-frame scene elements less, and downscale near-edge scene elements more.

Figure 8:
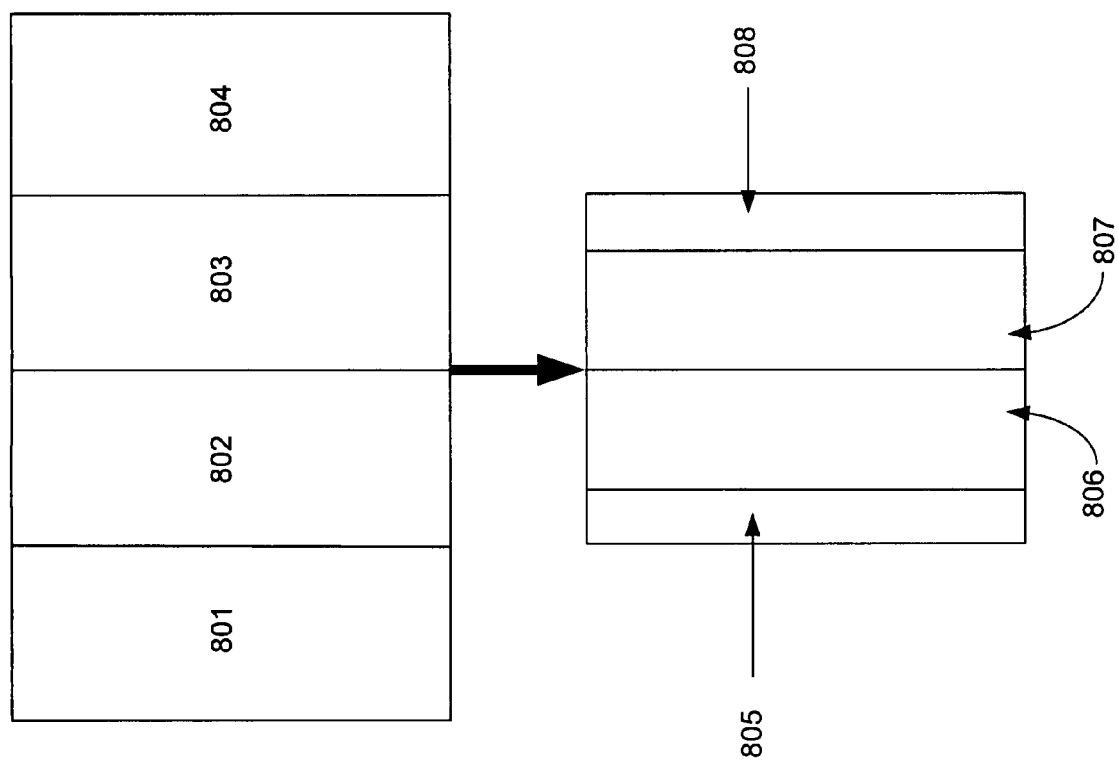
FIG. 8 shows a simple example of variable scaling, applied horizontally.

In the example shown in FIG. 8, rather than performing a horizontal-dimension scaling by 50% overall, the middle half of the frame (regions 802 and 803) can be scaled horizontally to 65% (resultant regions 806 and 807), while the quarter of the frame on the left side of the frame (801), and the quarter of the frame on the right (804), are scaled to a more drastic 35% (805 and 808). More sophisticated variations of variable scaling can be performed, such as by using a greater number of regions to be scaled by different amounts, using a scaling method that is continuously variable. Also, techniques discussed above, such as alternating techniques and/or staggering, may be combined with variable scaling.

The end result with variable scaling is that the more important scene elements, such as mid-scene elements, having undergone less drastic scaling, remain at a higher quality with better sharpness and fewer visual artifacts. Meanwhile, less important scene elements, such as near-edge elements, have a reduction of quality, but not so drastic that a typical user would notice, given that such a user is likely to be focused more on the mid-scene areas. Again, this may be particularly useful and beneficial in stereoscopic viewing in a theater setting.

The variable scaling technique can also be applied in a scene-dependent manner, where, depending on the nature of the scene, the zones of highest quality scaling might change. For example, in a scene where the most important action is toward the left side of the frame, variable scaling can be temporarily employed to favor the left side. A technician can determine the variable scaling "recipe" of a particular scene during video editing, or the scene and appropriate scaling could be arrived at using an automatic process. For example, variable scaling may entail reserving the highest quality scaling for parts of the scene with the greatest amount of sharp-detail and/or motion. In either case, the scaling recipe can be encoded in some manner so that the frame can be demultiplexed appropriately.

Another technique that can be combined with any of the techniques mentioned so far is sharpening. Any of a number of sharpening algorithms ("unsharp mask" being an example) can be applied either during the multiplex or demultiplex stage (or perhaps both). Sharpening could, for example, restore edge sharpness to a scene that has lost some sharpness due to filtered scaling, and do so without introducing the visual artifacts that might have otherwise occurred using an inherently sharper technique such as pixel selection.

When combined with variable scaling, sharpening to a variable degree may result in a better overall picture. Parts of the scene that are scaled more drastically during the multiplex will typically require greater sharpening as well, in order to maintain a more uniform scene texture in the final result.

All of the techniques mentioned so far have been discussed with respect to a side-by-side precursor format arrangement, where full-frame left-eye and right-eye information are reduced horizontally to fit in a left-half or right-half sub-frame area. All of these techniques (in various combinations) can be applied just as well for different precursor formats, such as "above-below" (where left-eye and right-eye information need to be squashed vertically to fit in top-half or bottom-half sub-frame areas).

There are other more complicated precursor format variations possible, and all or most of the above techniques are likely to apply in such variations as well.

Figure 9:
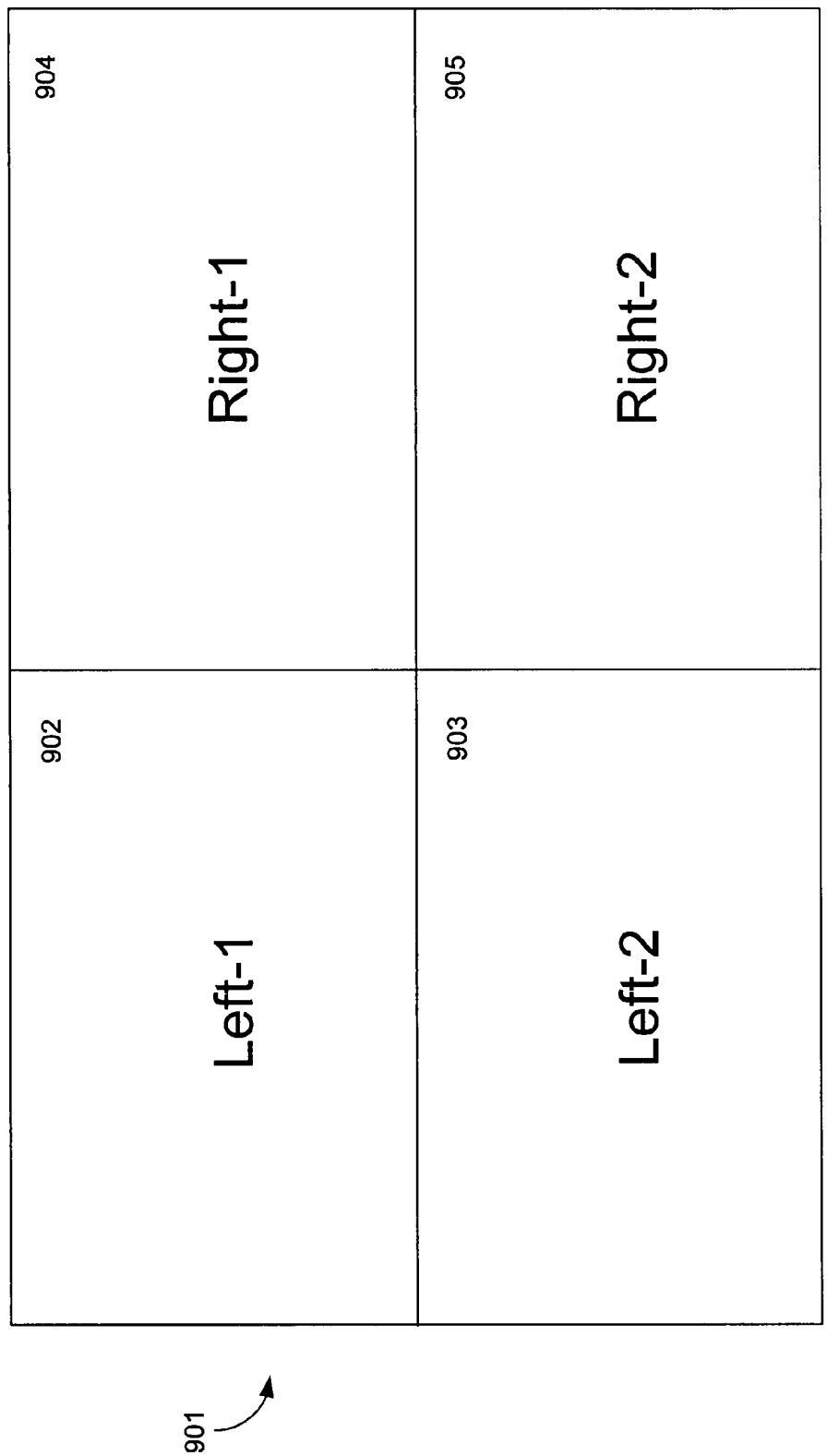
FIG. 9 illustrates an example of a four-tile precursor format.

One possible precursor format is "four-tile" such as shown in FIG. 9, where the image frame 901 is divided into four equal sized rectangular regions (for example, a 1920×1080 frame would be divided into four 960×540 regions). Two of these regions would be allocated to each eye-view (regions 902 and 903 for the left-eye view, regions 904 and 905 for the right-eye view), thus allowing two different multiplexing techniques to be used and stored separately. The demultiplex stage may subsequently combine the two source regions per eye-view, utilizing them to create a restored image that is better than if either technique was used on its own.

An example of the four-tile precursor format takes the results of staggered selection, stores the selected pixels from even-numbered rows in one left-eye-view tile, and stores the (staggered) selected pixels from odd-numbered rows in the other left-eye-view tile. By storing the staggered rows separately, the stagger effect is absent from any given tile, which can allow for cleaner image compression.

The four-tile precursor format can be useful for any kind of staggering and/or alternating technique approach, such as those discussed above. The processor simply stores the results from one technique in one tile, and the results from the other technique (and/or with staggering) in the other tile. Furthermore, because each tile has dimensions of the same aspect ratio as the full frame, dimension-neutral scaling techniques become practical.

Figure 10:
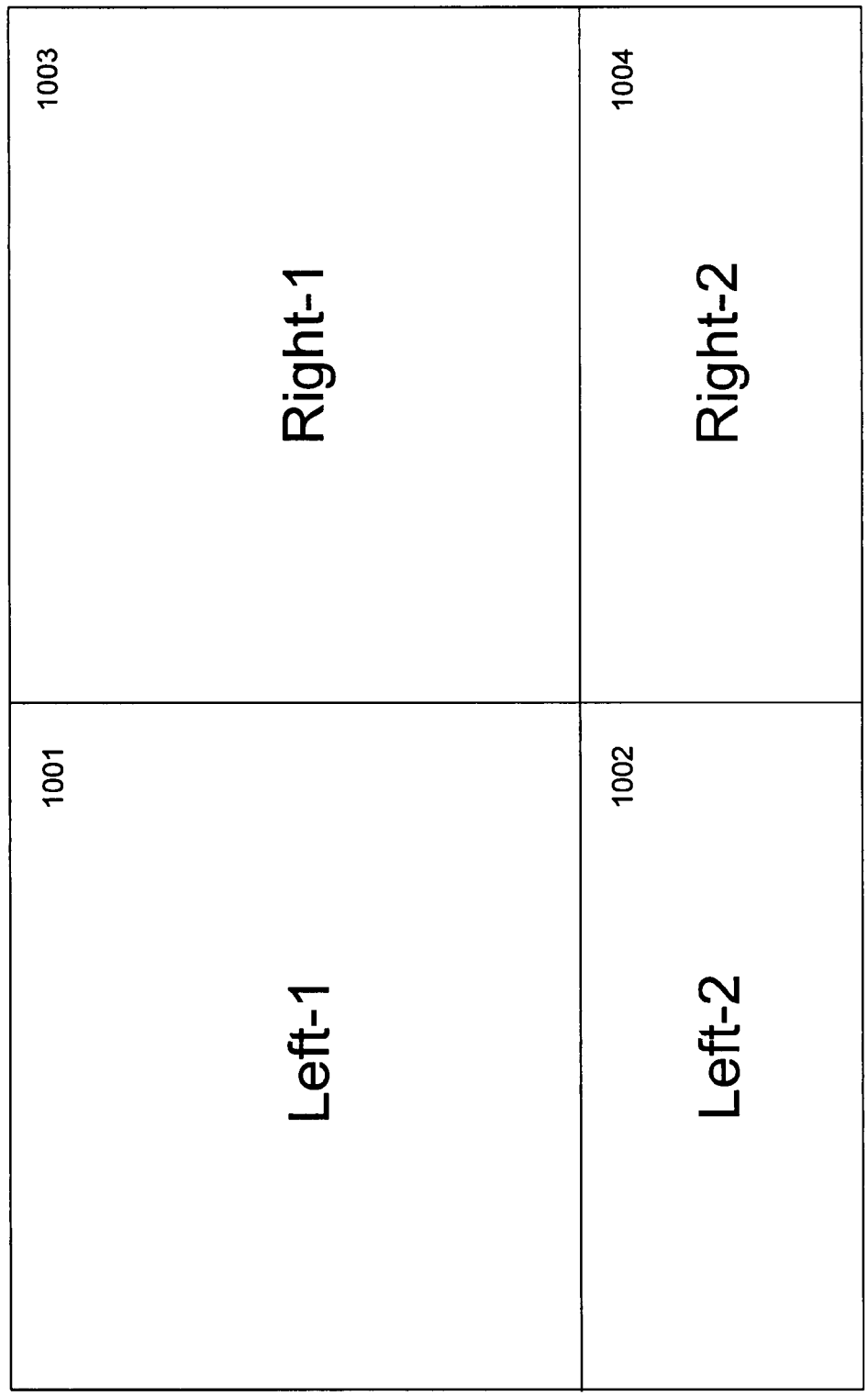
FIG. 10 is another variation of four-tile precursor format.

Another approach combines variable scaling with four-tile. Variable scaling can be applied in arriving at what each tile contains, or (in a different four-tile topology variation) the tiles themselves could be of unequal size, thus allowing one tile's combination of techniques to be emphasized. An example of this combined technique is shown in FIG. 10, where the combined techniques are done in one region at a higher quality, as shown by frames 1001 and 1003 for each respective eye-view, compared to the other tile's combination of techniques, which in FIG. 10 have frame less space allocated, shown by frames 1002 and 1004.

One of the main reasons for rearranging image data in contiguous tiles at all is because data compression is typically applied after the image frame data is multiplexed. Image and video compression algorithms rely heavily on the fact that pixels in a particular region tend to be similar to each other. Thus, the more closely precursor image fields resemble actual image data, the better they are likely to be treated by compression algorithms. Scrambling the image data too much defeats any benefits of a typical image compression algorithm.

However, if a particular compression algorithm can be relied on to respect certain boundaries, precursor formats and multiplexing technique can exploit that, gaining extra flexibility. For example, most JPEG compression algorithms work with 8×8 pixel blocks. Thus, the ninth pixel in a particular row should have no effect on how any of the first eight pixels in that row are compressed. Because 8×8 pixel blocks are relatively small compared to the overall video frame, using an algorithm that "stacks" 8×8 blocks allows for two-dimensional selection and/or scaling techniques that would not otherwise be appropriate for simple two-tile precursor formats such as side-by-side. Stacking in this sense means rearranging the blocks to fit within a predetermined frame, such as half of the original uncompressed image frame. In general, a process to decrease the number of pixels by removing pixels or combining pixels is performed, such as non-variable scaling, followed by rearranging the resultant blocks to fit in a desired space, such as half the original frame.

Figure 11:
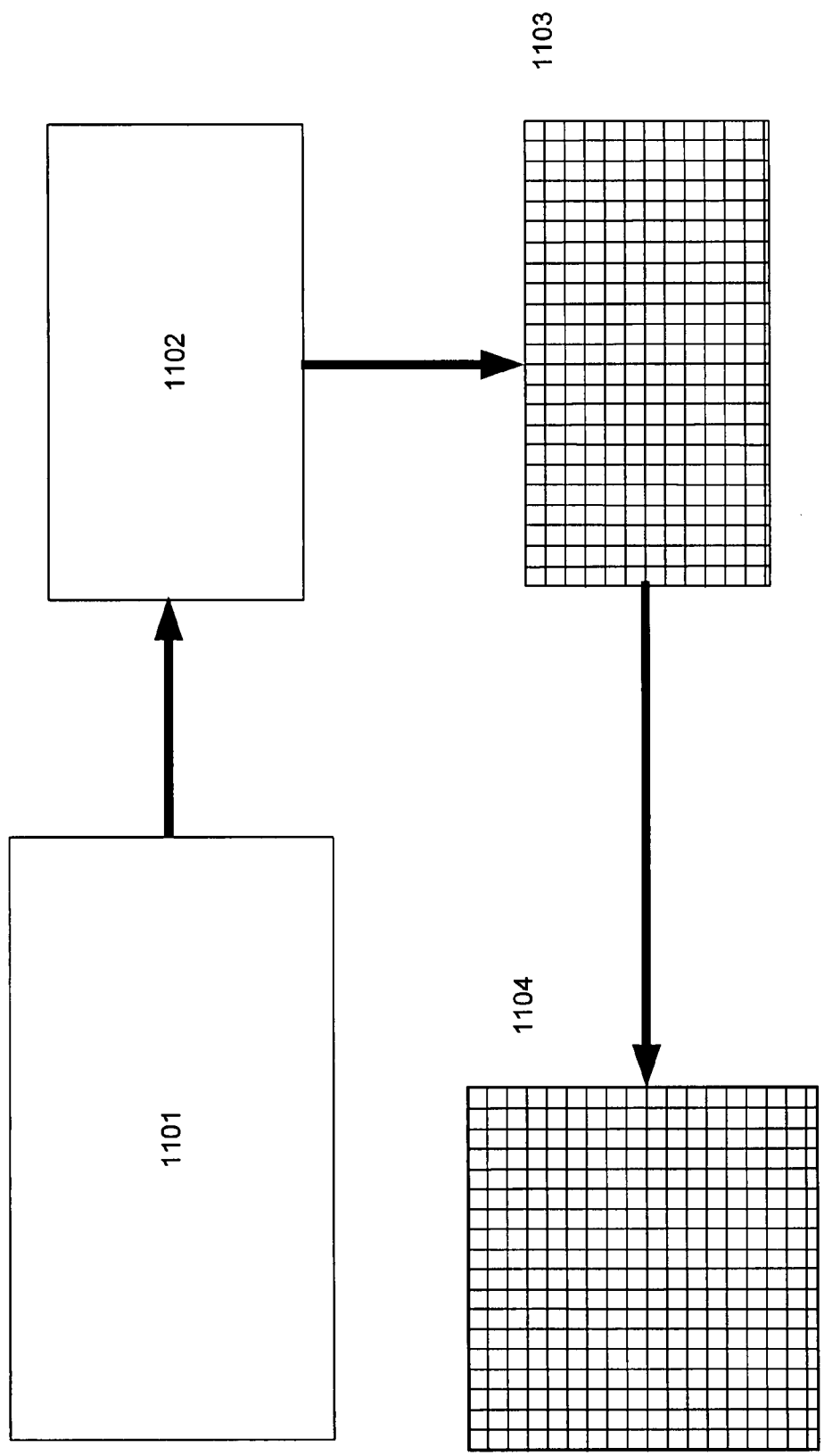
FIG. 11 shows how a stereo image component can be scaled uniformly along both dimensions and partitioned into blocks.

One example of this is shown in FIG. 11. Taking the left-eye view 1101 at 1920×1080, and applying two-dimensional bicubic scaling to 70% along each dimension yields a 1344× 756 result 1102. That result can be broken up into 8×8 blocks 1103, which could be stacked into an area comprising half of the overall 1920×1080 frame 1104, freeing the other half of the frame for storing the scaled and stacked right-eye view. Alternatively, a sophisticated two-dimensional variable scaling scheme could be used. After the variable scaling, the scaled results could be stacked, then compressed. When played, the image is decompressed, and then demultiplexing un-stacks and undoes the variable scaling (along with any other techniques, such as sharpening, that might also be used). Other block arrangements are possible, including some that rotate or otherwise manipulate individual blocks in a manner that can subsequently be undone during demultiplexing.

Customized compression schemes can be employed that are specifically designed to work with particular precursor formats, stacking arrangements, image tile topologies, and scaling algorithms.

Figure 12:
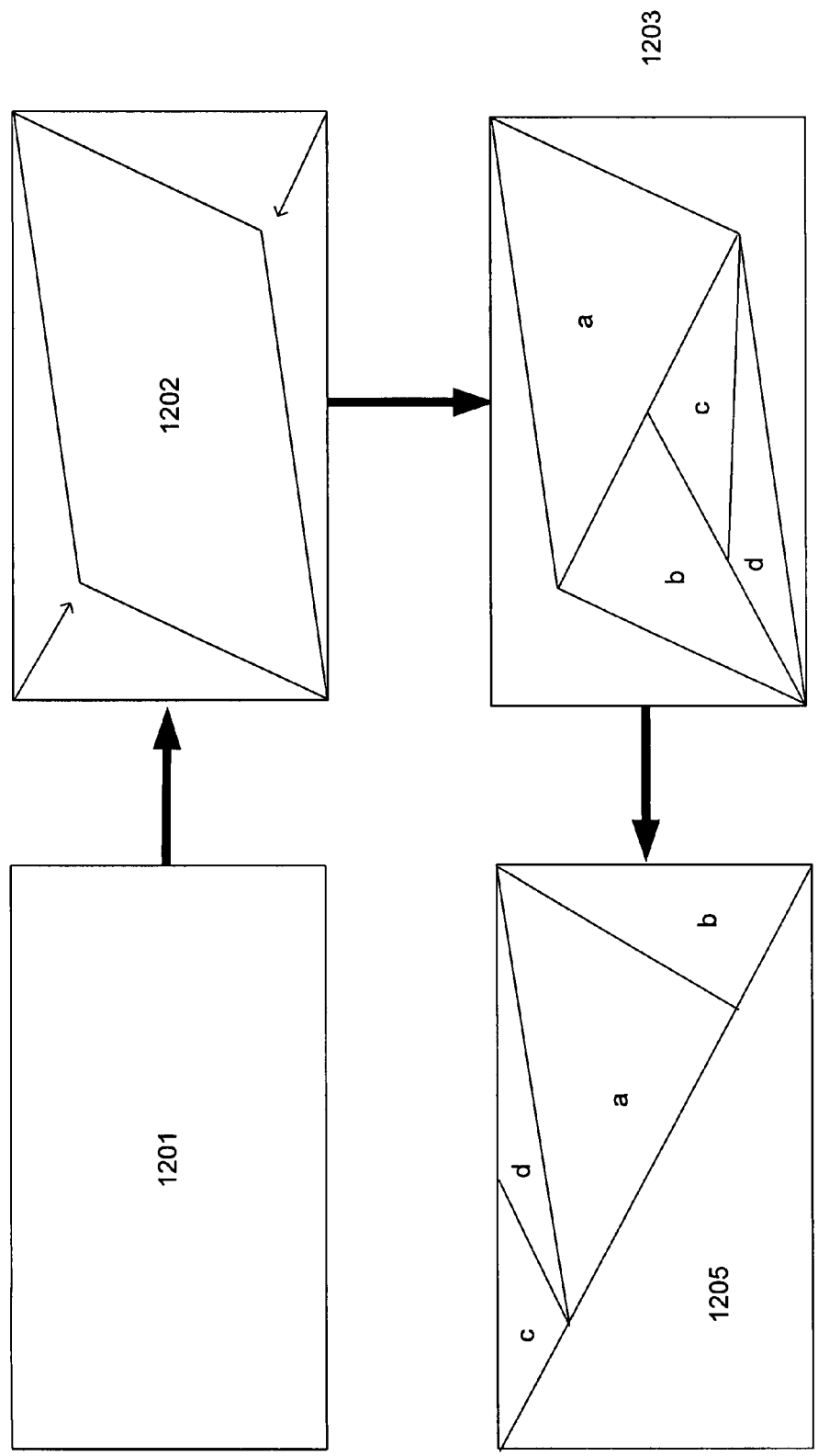
FIG. 12 illustrates one possible non-rectangular precursor format and partitioning arrangement using a parallelogram divided into subregions.

Precursor formats and tile topologies need not be rectangular. For example, as shown in FIG. 12, it might be advantageous to take each eye-view frame 1201 and apply a generally diagonal scaling, most likely done using some variation of filtered pixel mapping, such that the originally rectangular region is diagonally compressed into a parallelogram 1202. Triangular sub-regions 1203 of this parallelogram can then be rearranged to fit a precursor format 1204 such that left-eye and right-eye data are in triangular zones separated by the full frame's diagonal line. As a result, region 1205 becomes available for the other eye-view. Such a triangle-based precursor format, including smaller triangle tiling, requires a customized compression scheme that respects the unconventional tile boundaries. Another approach would be to use a diagonal morph to scale the source image to fit the triangular region of such a triangle-based precursor format, allowing it to work effectively with a standard compression algorithm.

Such a novel precursor format still allows various combinations of most of the same technique combinations discussed earlier, the same techniques that work with the simpler rectangular two-field side-by-side precursor format.

Demultiplexing

As discussed above, the focus of the present design is in multiplexing or condensing the signal to conform to known transmission media in accordance with established transmission standards. Once the signal has been multiplexed or processed according to the foregoing and transmitted to a receiver, the received information must be demultiplexed. This design specifically does not spell out demultiplexing procedures or designs, but acknowledges that such demultiplexing must occur. Demultiplexing restores regions of the scene to their original respective states or a close approximation thereof.

One way to demultiplex is to simply run the opposite procedure on the received data. For example, if the signal has been staggered into a two-tile format and sharpened, the demultiplexer can unstagger the signal from a two tile format. Simple reverse processing such as this can, however, take a great deal of time and processing and can be unacceptable in certain cases.

The multiplexing design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for multiplexing stereoscopic image source data, the method comprising:
    generating left images and right images from the stereoscopic image source data; and
    providing a plurality of single frames divided into portions, each single frame comprising:
    first and second right images disposed in first and second portions of the frame, respectively, and
    first and second left images disposed in third and fourth portions of the frame, respectively;
    wherein the first right image, the second right image, the first left image, and the second left image are formed using first, second, third, and fourth image size reduction techniques, respectively,
    wherein at least one of the first, second, third, and fourth image size reduction techniques is different from another one of the first, second, third, and fourth image size reduction technique; and
    wherein the first and second right images comprise image data operable to form a same output right-image frame, and the first and second left images comprise image data operable to from a same output left-image frame.

2. The method of claim 1, wherein the first and second left images are associated with the first and second right images.

3. The method of claim 1, wherein the portions are included within each single frame, and wherein the first and second left images are included in substantially one half of each single frame and the first and second right images are included in substantially another half of each single frame.

4. The method of claim 3, wherein each single frame is divided by a vertically oriented border, with the first and second right images on a first side of the single frame and the first and second left images on a second side of the single frame.

5. The method of claim 1, wherein each left image is based on an unprocessed left image and each right image is based on an unprocessed right image, and the method further comprises:
    removing every alternate pixel from every row in the uncompressed right image to form the right image and every alternate pixel from every row in the uncompressed left image to form the left image.

6. The method of claim 5, wherein removal of alternate pixels in each row comprises removing a first set of pixels from a first row and a different set of pixels from each row adjacent to the first row.

7. The method of claim 6, wherein removal substantially forms a "checkerboard" type pattern of pixels being removed from the unprocessed right image and the unprocessed left image.

8. The method of claim 1, wherein each left image is based on an unprocessed left image and each right image is based on an unprocessed right image, and the method further comprises:
    mapping pixel information from the unprocessed left image to one of the first and second left images based on information from a plurality of pixels from the unprocessed left image and mapping pixel information from the unprocessed right image to one of the first and second right images based on information from a plurality of pixels from the unprocessed right image.

9. The method of claim 1, further comprising applying a process to one of the first and second left images and one of the first and second right images, the process selected from at least one from a group comprising:
    variably applied bicubic scaling;
    variable sharpening;
    non-variably applied bicubic scaling; and
    non-variable sharpening.

10. The method of claim 1, wherein each left image is based on an unprocessed left image and each right image is based on an unprocessed right image, and the method further comprises:
    mapping pixel information from the unprocessed left image to one of the first and second left images by combining more pixels from predetermined areas of the unprocessed left image than other areas of the unprocessed left image, and mapping pixel information from the unprocessed right image to one of the first and second right images by combining more pixels from predetermined areas of the unprocessed right image than other areas of the unprocessed right image.

11. The method of claim 1, wherein each left image is based on an unprocessed left image having comprising alternating rows and remaining rows of pixels and each right image is based on an unprocessed right image comprising alternating and remaining rows of pixels, and the method further comprises:
    mapping pixel information from the unprocessed left image to the left image by combining pixels from alternating rows of the unprocessed left image and selecting pixels from remaining rows of the unprocessed left image, and mapping pixel information from the unprocessed right image to the right image by combining pixels from alternating rows of the unprocessed right image and selecting pixels from remaining rows of the unprocessed right image.

12. The method of claim 1, wherein each left image is based on an unprocessed left image comprising alternating rows and remaining rows of pixels and each right image is based on an unprocessed right image comprising alternating and remaining rows of pixels, and the method further comprises:
    mapping pixel information from the unprocessed left image to one of the first and second left images by combining at least two pixels from first positions in alternating rows of the unprocessed left image and combining at least two pixels from second positions in remaining rows of the unprocessed left image, and mapping pixel information from the unprocessed right image to one of the first and second right images by combining at least two pixels from first positions in alternating rows of the unprocessed right image and combining at least two pixels from second positions in remaining rows of the unprocessed right image.

13. The method of claim 1, wherein each left image and each right image is based on at least one unprocessed image, and the method further comprises:
    performing a process on at least one unprocessed image to reduce image size to form at least one resultant image;
    dividing each resultant image into a plurality of blocks; and
    rearranging the plurality of blocks to fit within a predefined space smaller than each unprocessed image.

14. The method of claim 1, wherein the first and second left images are based on an unprocessed left image and the first and second right images are based on an unprocessed right image, and the method further comprises:
    mapping pixel information from the unprocessed left image to one of the first and second left images based on information from a plurality of pixels from the unprocessed left image and mapping pixel information from the unprocessed right image to one of the first and second right images based on information from a plurality of pixels from the unprocessed right image;

wherein the mapped pixel information for the first and second left images are different and the mapped pixel information for the first and second right images are different.

15. A method for multiplexing stereoscopic image data, the method comprising:
  reducing pixels in a plurality of images by removing select pixels from the plurality of images; and
  placing the plurality of images together in a frame configured for transmission, the frame comprising:
    first and second right images disposed in first and second portions of the frame, respectively, and
    first and second left images disposed in third and fourth portions of the frame, respectively;
  wherein the first right image, the second right image, the first left image, and the second left image are formed using first, second, third, and fourth image size reduction techniques, respectively,
  wherein at least one of the first, second, third, and fourth image size reduction techniques is different from another one of the first, second, third, and fourth image size reduction technique; and
  wherein the first and second right images comprise image data operable to form a same output right-image frame, and the first and second left images comprise image data operable to form a same output left-image frame.

16. The method of claim 15, wherein the first and second left images are associated with first and second right images.

17. The method of claim 15, wherein the portions are included within the frame configured for transmission, and wherein the first and second left images are included in substantially one half of each frame configured for transmission and the first and second right images are included in substantially another half of each frame configured for transmission.

18. The method of claim 17, wherein each frame configured for transmission is divided by a vertically oriented border, with the first and second right images on a first side of the single frame and the first and second left images on a second side of the single frame.

19. The method of claim 15, wherein each left image is based on an unprocessed left image and each right image is based on an unprocessed right image, and the method further comprises:
  removing every alternate pixel from every row in the uncompressed right image to form the right image and every alternate pixel from every row in the uncompressed left image to form the left image.

20. The method of claim 19, wherein removal of alternate pixels in each row comprises removing a first set of pixels from a first row and a different set of pixels from each row adjacent to the first row.

21. The method of claim 20, wherein removal substantially forms a "checkerboard" type pattern of pixels being removed from the unprocessed right image and the unprocessed left image.

22. The method of claim 15, wherein each left image is based on an unprocessed left image and each right image is based on an unprocessed right image, and the method further comprises:
  mapping pixel information from the unprocessed left image to one of the first and second left images based on information from a plurality of pixels from the unprocessed left image and mapping pixel information from the unprocessed right image to one of the first and second right images based on information from a plurality of pixels from the unprocessed right image.

23. The method of claim 15, further comprising applying a process to one of the first and second left images and one of the first and second right images, the process selected from at least one from a group comprising:
  variably applied bicubic scaling;
  variable sharpening;
  non-variably applied bicubic scaling; and
  non-variable sharpening.

24. The method of claim 15, wherein each left image is based on an unprocessed left image and each right image is based on an unprocessed right image, and the method further comprises:
  mapping pixel information from the unprocessed left image to one of the first and second left images by combining more pixels from predetermined areas of the unprocessed left image than other areas of the unprocessed left image, and mapping pixel information from the unprocessed right image to one of the first and second right images by combining more pixels from predetermined areas of the unprocessed right image than other areas of the unprocessed right image.

25. The method of claim 15, wherein each left image is based on an unprocessed left image having comprising alternating rows and remaining rows of pixels and each right image is based on an unprocessed right image comprising alternating and remaining rows of pixels, and the method further comprises:
  mapping pixel information from the unprocessed left image to the left image by combining pixels from alternating rows of the unprocessed left image and selecting pixels from remaining rows of the unprocessed left image, and mapping pixel information from the unprocessed right image to the right image by combining pixels from alternating rows of the unprocessed right image and selecting pixels from remaining rows of the unprocessed right image.

26. The method of claim 15, wherein each left image is based on an unprocessed left image comprising alternating rows and remaining rows of pixels and each right image is based on an unprocessed right image comprising alternating and remaining rows of pixels, and the method further comprises:
  mapping pixel information from the unprocessed left image to one of the first and second left images by combining at least two pixels from first positions in alternating rows of the unprocessed left image and combining at least two pixels from second positions in remaining rows of the unprocessed left image, and mapping pixel information from the unprocessed right image to one of the first and second right images by combining at least two pixels from first positions in alternating rows of the unprocessed right image and combining at least two pixels from second positions in remaining rows of the unprocessed right image.

27. The method of claim 15, wherein each left image and each right image is based on at least one unprocessed image, and the method further comprises:
  performing a process on at least one unprocessed image to reduce image size to form at least one resultant image;
  dividing each resultant image into a plurality of blocks; and
  rearranging the plurality of blocks to fit within a predefined space smaller than each unprocessed image.

28. The method of claim 15, wherein the first and second left images are based on an unprocessed left image and the first and second right images are based on an unprocessed right image, and the method further comprises:

mapping pixel information from the unprocessed left image to one of the first and second left images based on information from a plurality of pixels from the unprocessed left image and mapping pixel information from the unprocessed right image to one of the first and second right images based on information from a plurality of pixels from the unprocessed right image;

wherein the mapped pixel information for the first and second left images are different and the mapped pixel information for the first and second right images are different.

* * * * *